J. M. HILL.
Improvement in Animal Traps.
No. 123,779. Patented Feb. 20, 1872.
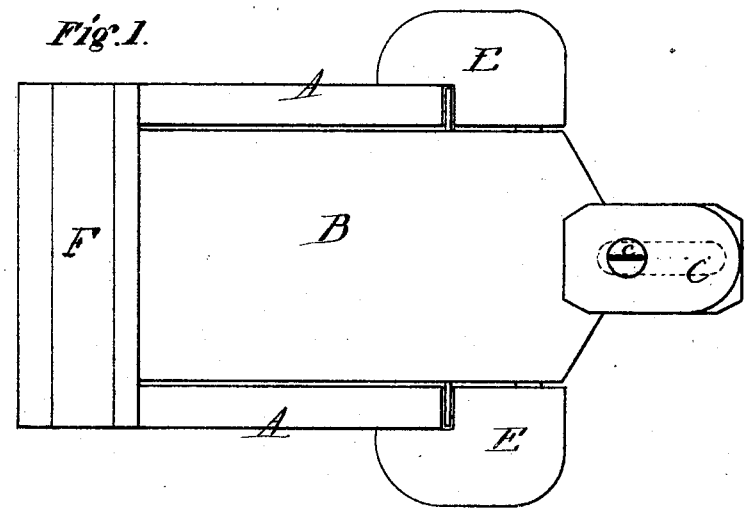
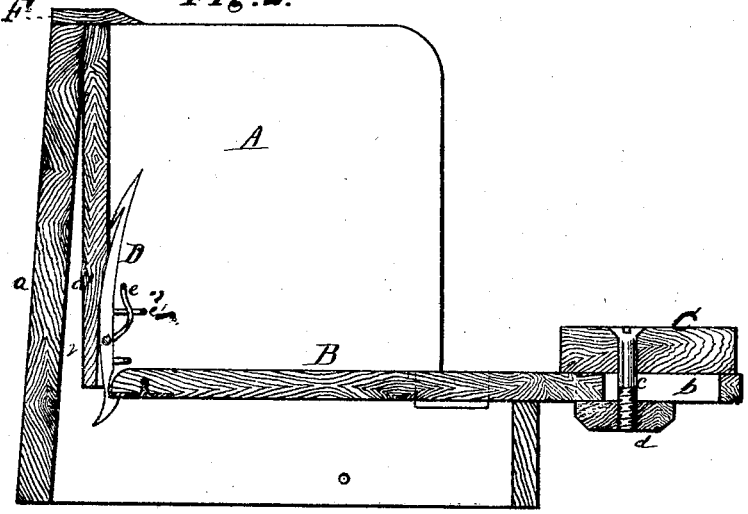

UNITED STATES PATENT OFFICE.

JAMES M. HILL, OF CISNE, ILLINOIS.

IMPROVEMENT IN ANIMAL-TRAPS.

Specification forming part of Letters Patent No. 123,779, dated February 20, 1872.

*To all whom it may concern:*

Be it known that I, JAMES M. HILL, of Cisne, in the county of Wayne and State of Illinois, have invented a new and valuable Improvement in Trapping; and I do hereby declare that the following is a full, clear, and exact description of the construction and operation of the same, reference being had to the annexed drawing making a part of this specification, and to the letters and figures of reference marked thereon.

Figure 1 of the drawing is a representation of a top view of my rat-trap. Fig. 2 is a central vertical longitudinal section of my invention.

This invention has relation to animal-traps having balanced tilting platforms supported by trigger bait-hooks. The novelty consists in the peculiar construction of the bait-hook and end of trap, and in the arrangement of the platform balance.

Referring to the accompanying drawing illustrating this invention, A represents a box, open at the top and at one end, and placed over a box or barrel to receive the animal when caught. B designates a platform hinged or pivoted to the sides of the box A near its open end, and balanced by means of a weight, C. $b$ represents a slot cut in the platform to receive a screw or bolt, $c$, which secures the weight C and renders it adjustable to suit the weight of a rat, mouse, or other animal. $d$ represents a nut on the lower end of the screw $c$. D designates a trigger pivoted to the forward part of the box A, which is made double, one of the boards, $a$, being inclined, and the other, $a'$, perpendicular. The trigger is attached to the latter, and is notched at its lower end to hold the end of the tilting platform. A spring, $e$, inclosed within a staple, $e'$, keeps the trigger in position, so that the platform will be locked automatically. The upper end of the trigger is barbed to form a bait-hook, and prevent the bait from falling or being pulled off. The trigger is sprung when the rat or other animal attempts to nibble the bait, and the platform tilted by his weight. The object of the double boards $a$ $a'$ is to create a space, $a''$, so that the animal cannot catch hold of anything as he falls. E represents wings to guide the animal to the interior of the box where he must go in order to get at the bait. F represents a cleat, placed across the top of the box A directly over the bait-hook. It is intended for the purpose of preventing the rat or other animal from reaching down for the bait instead of walking over the tilting platform.

I claim as my invention—

The animal-trap herein described, consisting of the box A, with double end, formed by the inclined boards $a$ $a'$, the cleat F, trigger D, spring $e$, guard $e'$, slotted tilt-board B, and adjustable weight C, with screw and clamp-nut, as specified.

In testimony that I claim the above I have hereunto subscribed my name in the presence of two witnesses.

JAMES M. HILL.

Witnesses:
 G. J. GEORGE,
 EDWARD E. LEONARD.